(12) United States Patent
Takikawa et al.

(10) Patent No.: US 8,390,957 B2
(45) Date of Patent: Mar. 5, 2013

(54) HEAD SUSPENSION AND METHOD OF MANUFACTURING HEAD SUSPENSION

(75) Inventors: Kenichi Takikawa, Aikoh-gun (JP); Hideki Fuchino, Aikoh-gun (JP); Masaki Yokota, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 162 days.

(21) Appl. No.: 12/836,936

(22) Filed: Jul. 15, 2010

(65) Prior Publication Data
US 2011/0013318 A1 Jan. 20, 2011

(30) Foreign Application Priority Data
Jul. 15, 2009 (JP) .............................. P2009-166600

(51) Int. Cl.
G11B 5/48 (2006.01)
G11B 21/16 (2006.01)
(52) U.S. Cl. .................. 360/244.9; 360/244.3
(58) Field of Classification Search ............. 360/244.2, 360/244.3, 244.5, 244.8, 244.9
See application file for complete search history.

(56) References Cited

U.S. PATENT DOCUMENTS

| | | | | |
|---|---|---|---|---|
| 4,670,804 A | * | 6/1987 | Kant et al. | 360/254.2 |
| 4,760,478 A | * | 7/1988 | Pal et al. | 360/244.3 |
| 4,912,583 A | * | 3/1990 | Hinlein | 360/244.5 |
| 5,390,058 A | * | 2/1995 | Yamaguchi | 360/244.5 |
| 5,471,734 A | * | 12/1995 | Hatch et al. | 29/603.03 |
| 5,898,543 A | * | 4/1999 | Jagt et al. | 360/244.8 |
| 6,088,192 A | * | 7/2000 | Riener et al. | 360/266.1 |
| 6,215,624 B1 | * | 4/2001 | Summers et al. | 360/244.5 |
| 6,388,842 B1 | * | 5/2002 | Murphy | 360/244.8 |
| 6,437,944 B2 | * | 8/2002 | Ohwe et al. | 360/244.1 |
| 2003/0179501 A1 | * | 9/2003 | Takagi et al. | 360/245 |
| 2004/0001287 A1 | * | 1/2004 | Honda et al. | 360/244.2 |
| 2004/0150919 A1 | * | 8/2004 | Saito et al. | 360/244.2 |
| 2004/0261515 A1 | * | 12/2004 | Umebayashi | 73/161 |
| 2006/0007599 A1 | * | 1/2006 | Shum | 360/244.8 |
| 2006/0221503 A1 | * | 10/2006 | Watadani et al. | 360/244.8 |
| 2007/0019331 A1 | * | 1/2007 | Kido et al. | 360/244.3 |
| 2008/0192383 A1 | * | 8/2008 | Takasugi et al. | 360/244.2 |
| 2010/0208389 A1 | * | 8/2010 | Ikeji | 360/244.2 |

FOREIGN PATENT DOCUMENTS
JP 8-329636 12/1996

* cited by examiner

Primary Examiner — Craig A. Renner
Assistant Examiner — Adam B Dravininkas
(74) Attorney, Agent, or Firm — Jordan and Hamburg LLP

(57) ABSTRACT

A head suspension 11 includes a load beam 17 having a base plate 13, a hinge part 15 resiliently supported by the base plate, and a rigid part 14 joined with the hinge part, a reinforcing plate 25 joined with the rigid part at a portion proximal to the hinge part, and a bend 17c on the load beam formed by bending the load beam toward the reinforcing plate along an edge 25a of the reinforcing plate. Only by accurately joining the reinforcing plate with the load beam in a sway direction (a widthwise direction of the head suspension), the load beam is easily and properly bent without torsion to form the bend 17c along the edge of the reinforcing plate that defines a bending strength boundary.

6 Claims, 7 Drawing Sheets

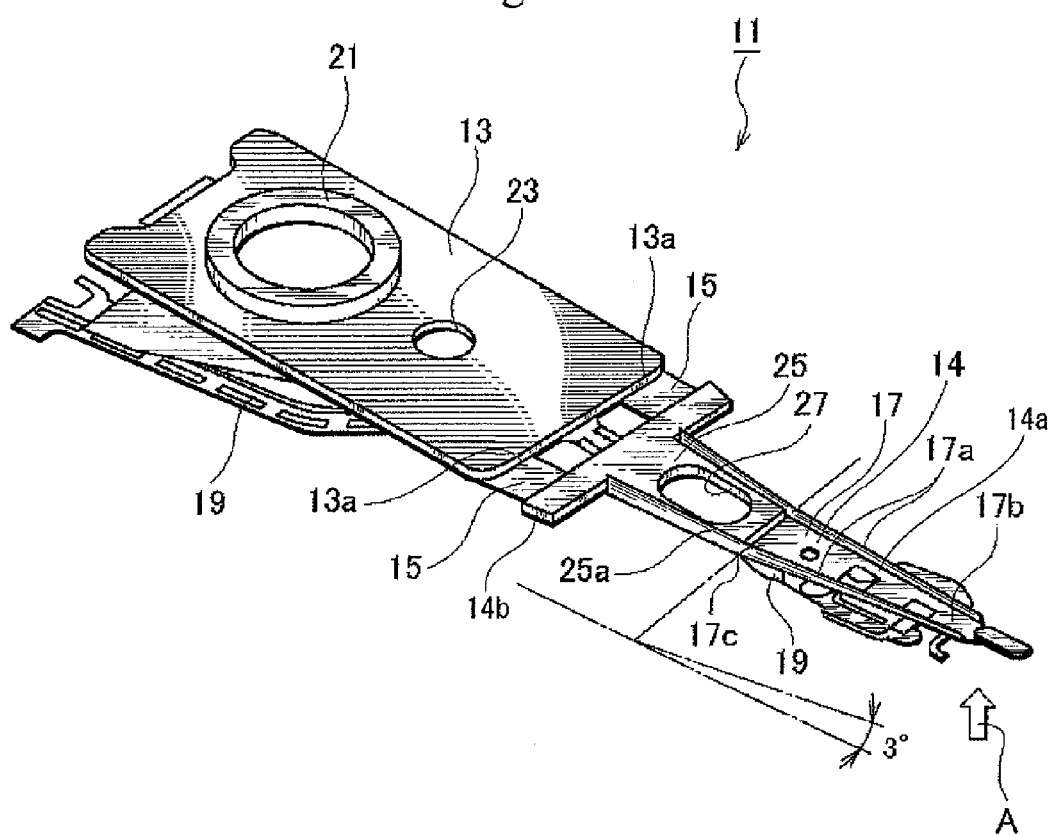

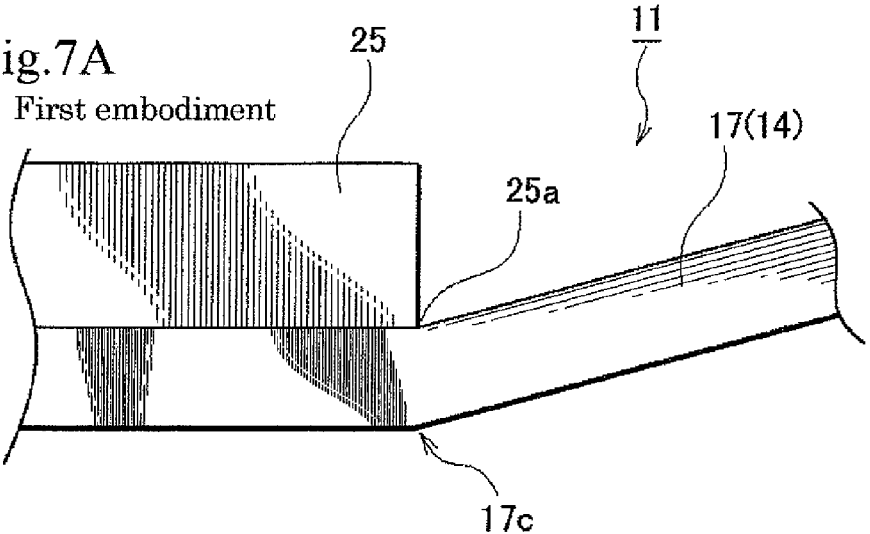
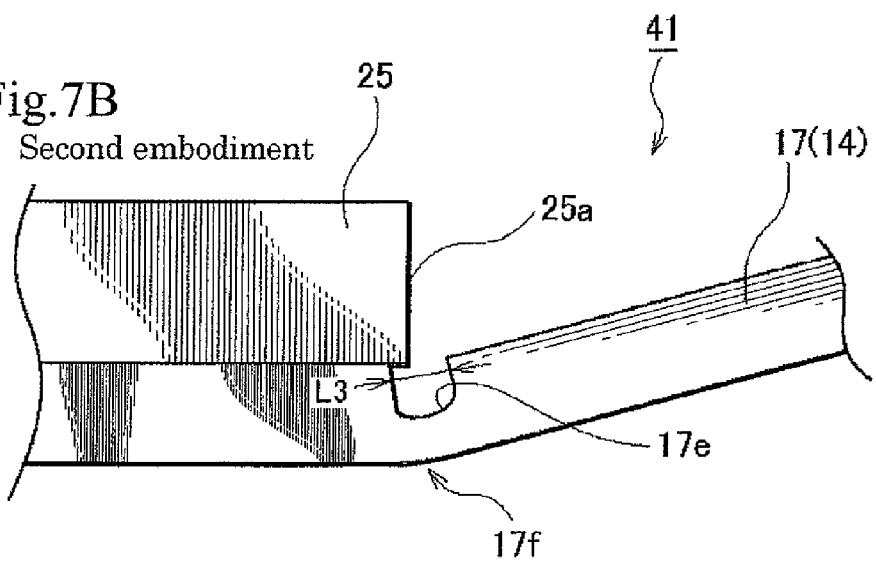
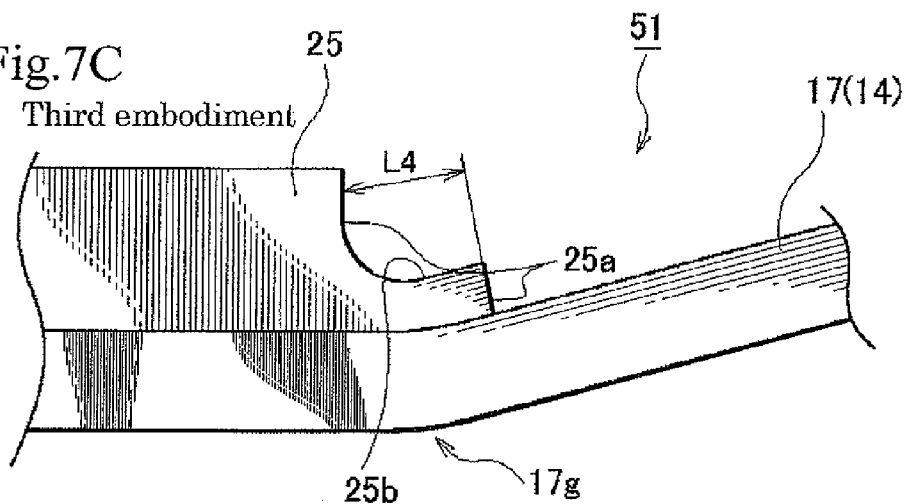

HEAD SUSPENSION AND METHOD OF MANUFACTURING HEAD SUSPENSION

BACKGROUND OF THE INVENTION

1. Field of the Invention

The present invention relates to a head suspension for supporting a data write/read magnetic head in a magnetic disk drive and a method of manufacturing such a head suspension.

2. Description of Related Art

A need for small-sized precision magnetic disk drives is rapidly increasing. To meet the need, high density recording technology for magnetic disks must be developed. For this, a technique of floating a write/read magnetic head slightly above a magnetic disk and stably keeping the air gap between them is important.

In connection with this, FIGS. 1A, 1B, and 1C illustrate a head suspension according to a related art disclosed in Japanese Unexamined Patent Application Publication No. H08-329636. FIG. 1A is a plan view illustrating the head suspension, FIG. 1B is a side view of the same, and FIG. 1C is a side view of the same with the head suspension installed in a hard disk drive and pressed toward a disk.

In FIGS. 1A to 1C, the head suspension 1 has a hinge part 4 to thrust the head 2 toward the disk 3, a gimbal 5 to resiliently support the head 2 so that the attitude of the head 2 may follow the rotating disk 3, a load beam 6 including the hinge pat 4 and gimbal 5, and a base plate 7 to resiliently support the load beam 6 through the hinge part 4.

The load beam 6 has an intermediate spring part 8 that is flexible. The hinge part 4 and spring part 8 each are bent so that each protrudes away from the disk 3. The head suspension 1 is attached through the base plate 7 to a carriage arm 9.

The head suspension 1 of the related art is capable of stably keeping an air gap between the head 2 and the disk 3 and properly maintaining dynamic characteristics including a resonant characteristic.

To provide each of the hinge part 4 and spring part 8 of the head suspension 1 with a bend, the load beam 6 is positioned and clamped between a stripper and a die and a free end of the load beam 6 is pressed with a punch. If the load beam 6 is twisted during the bending process, the dynamic characteristics of the head suspension 1 will deteriorate. Accordingly, the load beam 6 must precisely be positioned between the stripper and the die.

To meet the need for small-sized precision magnetic disk drives, the head suspension 1 and load beam 6 must be miniaturized. In miniaturization, it is very difficult to provide the load beam 6 with proper bends without torsion.

SUMMARY OF THE INVENTION

An object of the present invention is to provide a head suspension having a load beam provided with proper bends and no torsion, as well as a method of manufacturing such a head suspension.

In order to accomplish the object, an aspect of the present invention provides a head suspension including a load beam having a rigid part and a hinge part, a base plate resiliently supporting the rigid part through the hinge part of the load beam, a reinforcing plate joined with a portion of the rigid part proximal to the hinge part, and a bend on the load beam formed by bending the load beam toward the reinforcing plate along an edge of the reinforcing plate.

The head suspension according to this aspect of the present invention has the reinforcing plate attached to the rigid part of the load beam and the bend formed on the load beam. The bend is formed along the edge of the reinforcing plate without a twist.

The bend of the load beam is easily and properly formed with the edge of the reinforcing plate, i.e., a bending strength boundary serving as a bending line.

The head suspension of this aspect improves the rigidity of the rigid part at the portion proximal to the hinge part and the rigidity of the load beam as a whole with the use of the reinforcing plate, thereby securing optimum dynamic characteristics.

In this way, this aspect of the present invention easily and properly forms the bend on the load beam without a twist and provides the head suspension with proper dynamic characteristics.

BRIEF DESCRIPTION OF THE DRAWINGS

FIGS. 1A, 1B, 1C illustrate a head suspension according to a related art, in which FIG. 1A is a plan view, FIG. 1B is a side view, and FIG. 1C is a side view with the head suspension installed in a hard disk drive and pressed toward a disk;

FIG. 2 is a perspective view illustrating a head suspension according to a first embodiment of the present invention;

FIGS. 3A and 3B illustrate a part of the head suspension of FIG. 2, in which FIG. 3A is a plan view and FIG. 3B is a side view;

FIGS. 7A, 7B, and 7C are side views illustrating head suspensions according to the present invention, in which FIG. 7A is of the first embodiment, FIG. 7B is of a second embodiment, and FIG. 7C is of a third embodiment of the present invention.

DETAILED DESCRIPTION OF EMBODIMENTS

Head suspensions and a method of manufacturing a head suspension according to embodiments of the present invention will be explained in detail with reference to the drawings. The head suspension according to any one of the embodiments of the present invention has a bend formed on a load beam of the head suspension. The present invention easily and properly forms the bend without a twist by bending the load beam along an edge of a reinforcing plate attached to the load beam.

Now, a head suspension according to the first embodiment of the present invention will be explained.

Figure 1A:
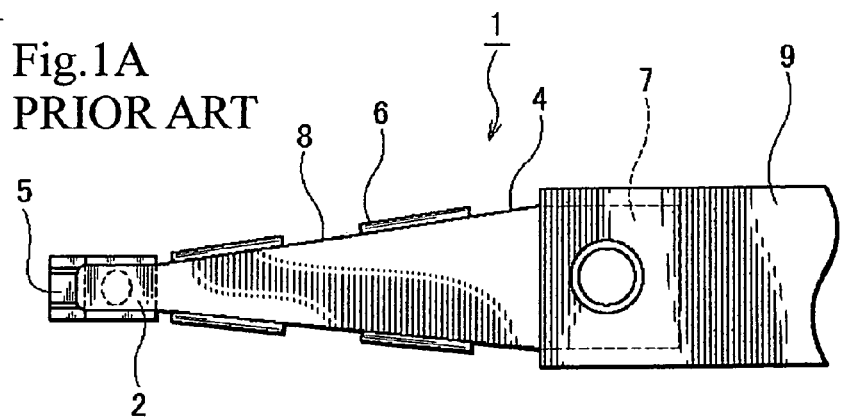
Figure 1B:
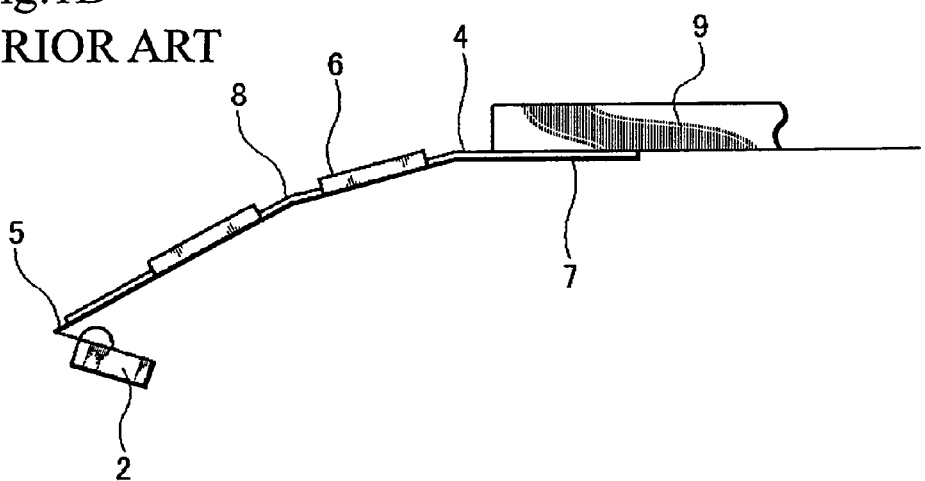
Figure 1C:
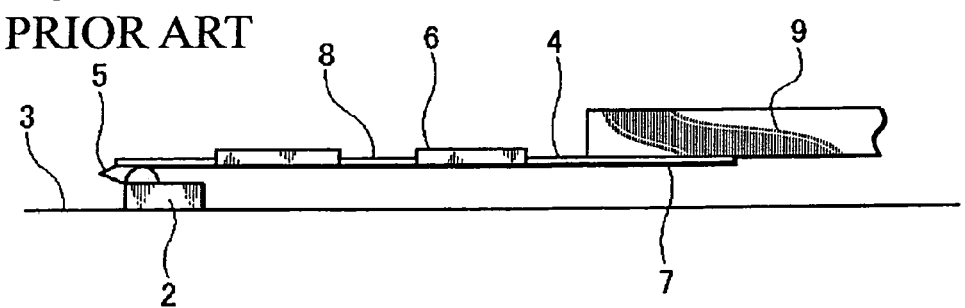
Figure 3A:
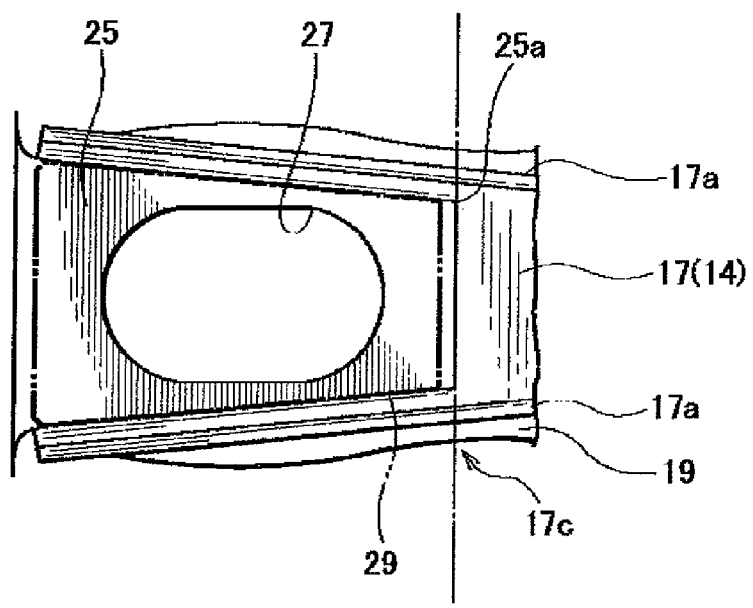
Figure 3B:
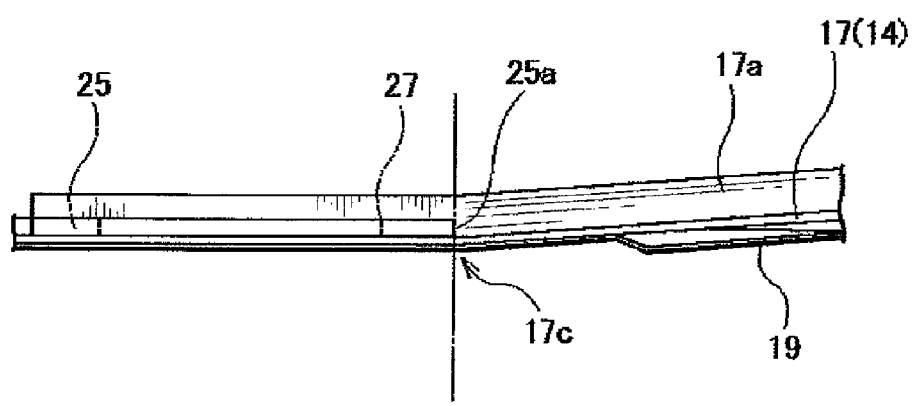

FIG. 2 is a perspective view illustrating the head suspension 11 according to the first embodiment, FIG. 3A is a plan view illustrating a part of the head suspension 11, and FIG. 3B is a side view of the part illustrated in FIG. 3A.

The head suspension 11 is for, for example, a 2.5-inch recording medium and has a base plate 13, a load beam 17, and a flexure 19 as shown in FIG. 2. The load beam 17 includes a rigid part 14 and a hinge part 15.

The base plate 13 resiliently supports the rigid part 14 through the hinge part 15.

The base plate 13 is made of a thin metal plate such as a thin stainless steel plate having a thickness in the range of about 150 to 200 μm. The base plate 13 may be made of light metal such as aluminum alloy, or a clad material including light metal and stainless steel.

The base plate 13 has a circular boss 21. With the boss 21, the base plate 13 is fixed to a front end of an actuator arm that is driven by a voice coil motor (not illustrated) to turn the head suspension 11. In front of the boss 21, the base plate 13 has a circular through hole 23 to reduce the weight of the head suspension 11 and position the same.

A front end 13a of the base plate 13 is joined with an end of the hinge part 15 by laser spot welding. Another end of the hinge part 15 is joined with a base end of the rigid part 14 by laser spot welding.

The rigid part 14 of the load beam 17 applies load onto a magnetic head slider (not illustrated) that corresponds to the "head" of the present invention and is used to write and read data to and from the recording medium, i.e., a magnetic disk.

The rigid part 14 is made of a resilient thin metal plate such as a stainless steel plate having a thickness in the range of about 30 to 150 μm (about 32 μm according to the first embodiment). The rigid part 14 may be made of light metal such as aluminum alloy, or a clad material including light metal and stainless steel.

The rigid part 14 has a rigid part body 14a extending in a longitudinal direction of the load beam 17. The rigid part body 14a has a base end to which a joint portion 14b is integrally formed. To the joint portion 14b, another end of the hinge part 15 is joined.

The joint portion 14b has protrusions each protruding with respect to the base end of the rigid part body 14a in a lateral direction to direction orthogonal to the longitudinal direction) of the load beam 17.

The rigid part 14 therefore substantially has a T-shape formed by the rigid part body 14a and joint portion 14b.

The hinge part 15 applies load onto the rigid part 14. The hinge part 15 is uniformly bent in a pitch direction by punching and pressing during the manufacturing of the head suspension 11.

The hinge part 15 is made of a resilient thin metal plate such as a stainless steel plate having a thickness of about 30 μm. The hinge part 15 may be made of light metal such as aluminum alloy, or a clad material including light metal and stainless steel.

The hinge part 15 has a pair of legs that extends between the base plate 13 and the rigid part 14. The hinge part 15 may be thinned if required. The rigid part 14 and hinge part 15 may be integral with each other, or may be separate from each other.

For example, the rigid part 14 and hinge part 15 may be cut as an integral structure from a material. Alternatively, the rigid part 14 and hinge part 15 may be separately prepared and are joined together by laser spot welding as this embodiment.

To improve the rigidity of the rigid part 14 at a portion proximal to or adjoining to the hinge part 15, a reinforcing plate 25 is attached to the rigid part 14 by laser spot welding as shown in FIGS. 2, 3A and 3B. The reinforcing plate 25 substantially has a T-shape overlapping or laid on the portion of the rigid part 14 that is proximal to the hinge part 15 and extends from an intermediate portion of the rigid part body 14a to the joint portion 14b.

The reinforcing plate 25 is made of a resilient thin metal plate such as a stainless steel plate of about 50 μm in thickness. The reinforcing plate 25 may be made of light metal such as aluminum alloy, or a clad material including light metal and stainless steel.

An area where the load beam 17 and reinforcing plate 25 are attached to each other is provided with an elliptic through hole 27 for balancing of improvement of the rigidity of the load beam 17 and reduction of the weight thereof. An area 29 surrounded with a two-dot-and-dash line in FIG. 3A is an area to which a die 35 is pressed.

The load beam 17 is bent along a front edge 25a of the reinforcing plate 25 toward the reinforcing plate 25 in a thickness direction of the load beam 17 (in the direction of an arrow A illustrated in FIG. 2) by about three degrees at the maximum, to form a bend 17c as shown in FIGS. 2 and 3B. The bend 17c is nearly at a longitudinal center of the load beam 17.

The bend 17c balances mass distributed along a torsional axis between the hinge part 15 and the apex of a dimple (not illustrated) of the magnetic head slider and moves the gravitational center of the load beam 17 including the magnetic head slider onto the torsional axis. This prevents the torsional axis from deviating from the apex of the dimple during operation of the hard disk drive. Namely, the bend 17c improves the dynamic characteristics of the load beam 17.

A part of the rigid part 14 on the hinge part 15 side with respect to the bend 17c, i.e., the portion of the rigid part 14 proximal to the hinge part 15 has an improved rigidity due to the reinforcing plate 25. This high rigidity part of the rigid part 14 provided with the reinforcing plate 25 firmly supports a front part 17b of the load beam 17 on the other side with respect to the bend 17c, i.e., a portion of the rigid part 14 distal to the hinge pat 15. This configuration prevents the load beam 17 from twisting or bending during an information seeking operation. This is advantageous in achieving a high-speed seeking operation or in realizing high-density tracks on a magnetic disk.

To improve the rigidity of the load beam 17 as a whole, the load beam 17 is provided with a pair of longitudinal bends 17a as shown in FIGS. 2, 3A and 3B. Each longitudinal bend 17a is formed by bending a side edge longitudinally extending from the base end to a front end of the rigid part body 14a of the rigid part 14 toward the reinforcing plate 25 in the thickness direction (in the direction of the arrow A illustrated in FIG. 2) by about 90 degrees. The longitudinal bends 17a improve the rigidity of the load beam 17.

The flexure 19 resiliently supports the write/read magnetic head. The flexure 19 is formed by etching, punching, or pressing a thin stainless steel plate. The flexure 19 is attached to the load beam 17 on the longitudinally opposite side portion with respect to the reinforcing plate 25, i.e., to the portion of the rigid part 14 distal to the hinge part 15 by laser spot welding.

Figure 4:
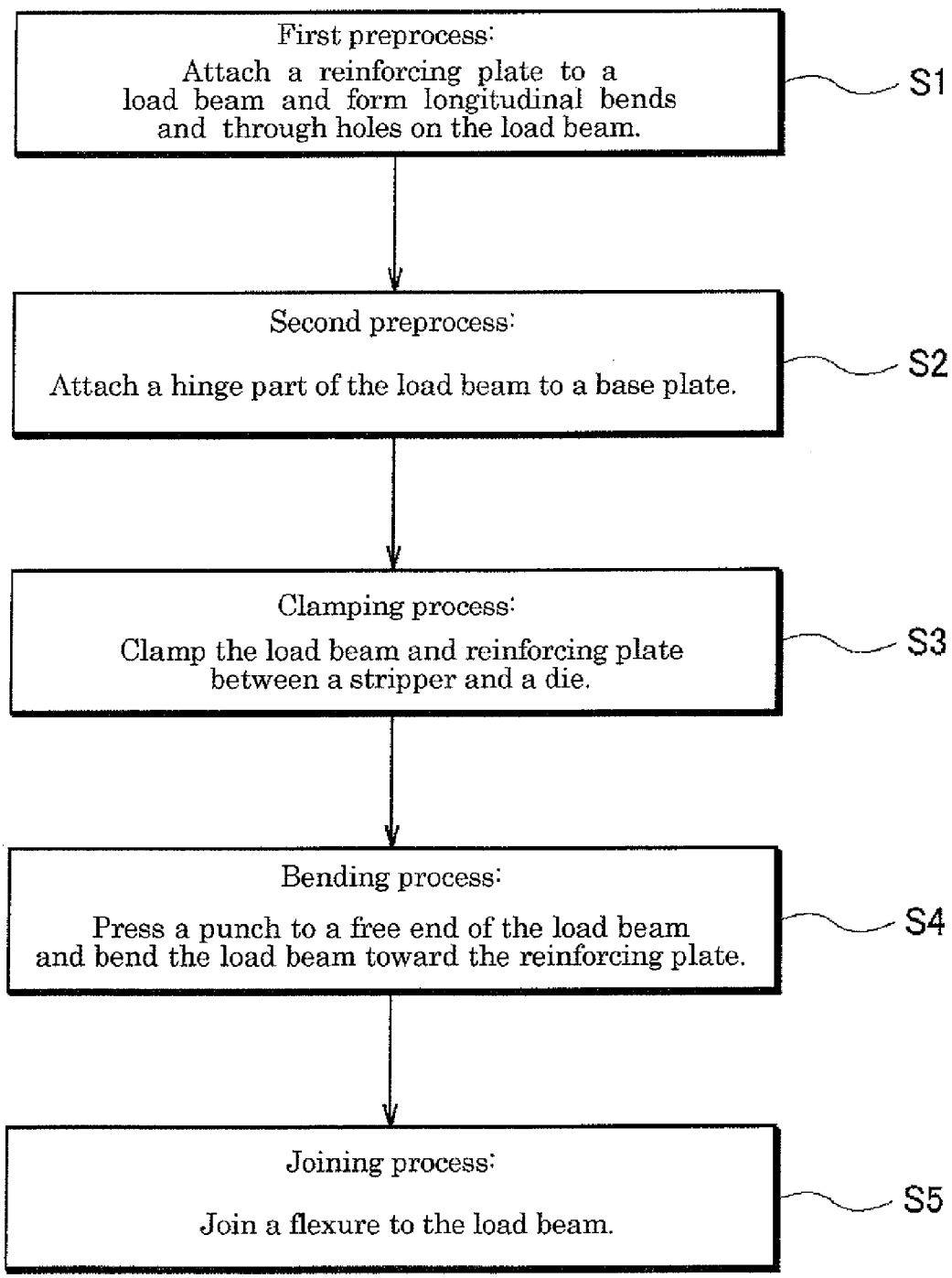
FIG. 4 is a flowchart illustrating a method of manufacturing a head suspension according to an embodiment of the present invention.
Figure 5:
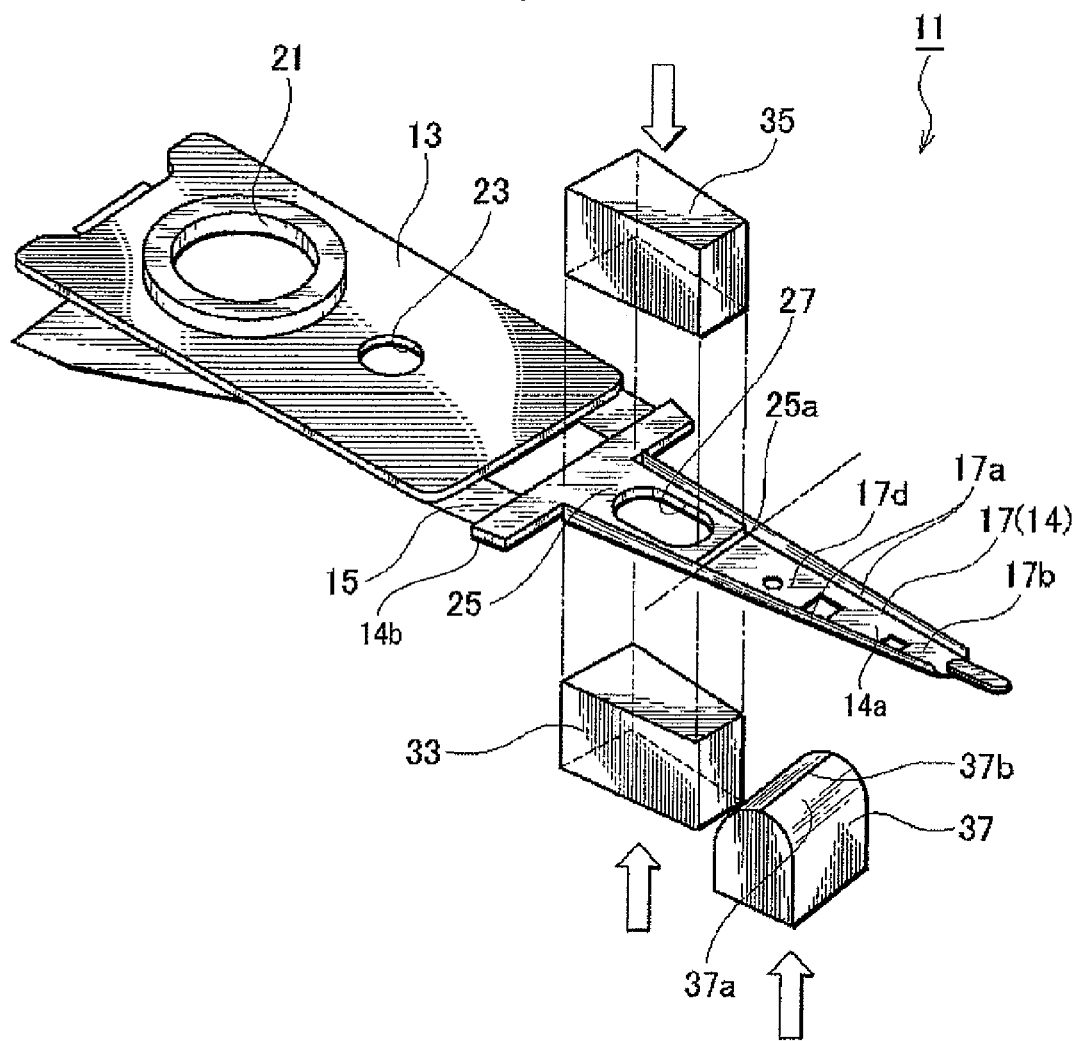
FIG. 5 is a perspective view illustrating a bending process according to the method of FIG. 4.
Figure 6:
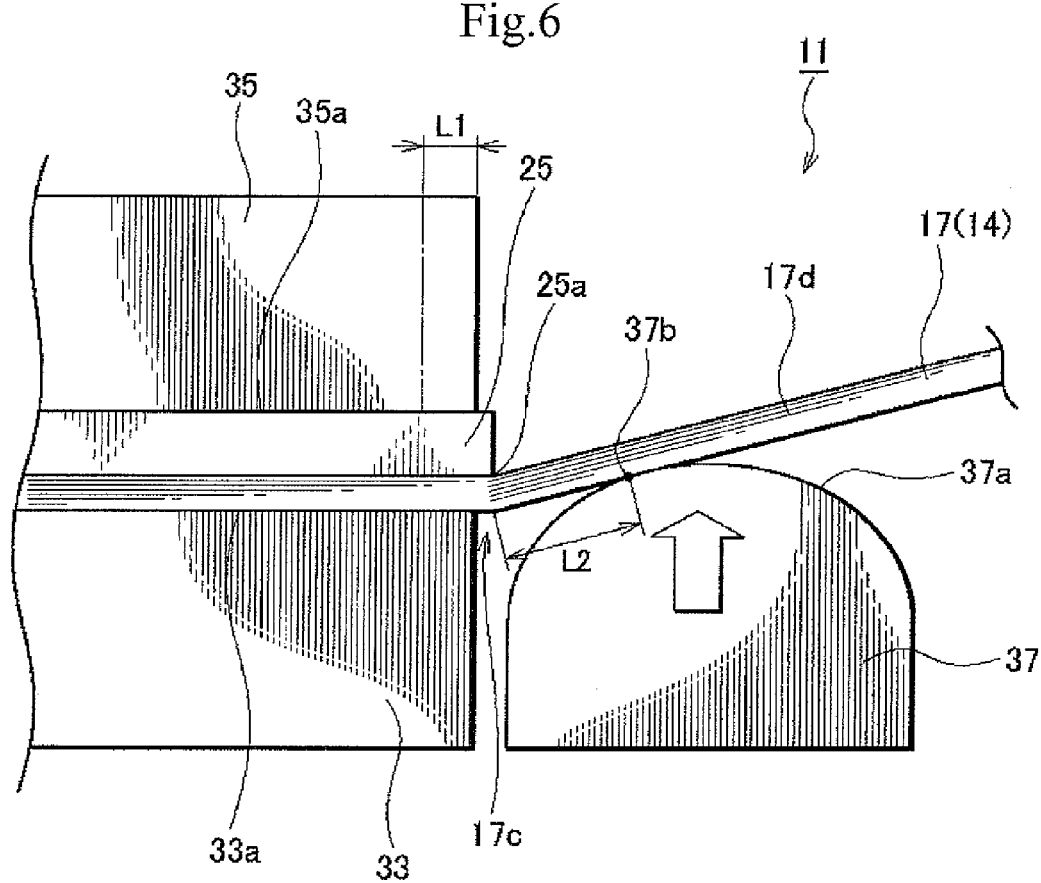
FIG. 6 is a side view illustrating the bending process of FIG. 5.

A method of manufacturing the head suspension 11 will be explained with reference to FIGS. 4 to 7A in which FIG. 4 is a flowchart illustrating the method, FIG. 5 is a perspective view illustrating a bending process according to the method of FIG. 4, FIG. 6 is a side view illustrating the bending process of FIG. 5, and FIG. 7A is a side view illustrating a bent part of the head suspension 11.

In FIG. 4, step S1 is a first preprocess that attaches the reinforcing plate 25 to the load beam 17 by laser spot welding, forms the longitudinal bends 17a by bending longitudinal edges of the load beam 17, and opens the through hole 27 by punching.

Step S2 is a second preprocess that attaches the hinge part 15 of the load beam 17 provided with the reinforcing plate 25 to the base plate 13 by laser spot welding.

Step S3 is a clamping process that clamps the area 29 (FIG. 3A) of the head suspension 11 where the load beam 17 and reinforcing plate 25 are joined together between a stripper 33 and a die 35 (FIG. 5).

The stripper 33 and die 35 are metal molds made of, for example, tool steel such as low-alloy tool steel, die steel, and high-speed tool steel. The shape of a clamping face of each of the stripper 33 and die 35 corresponds to the shape of the area 29 of the load beam 17 and reinforcing plate 25 as shown in FIGS. 5 and 6.

It is preferable that the clamping faces of the stripper 33 and die 35 have the same shape so that the clamping faces agree with each other when they clamp the area 29 of the load beam 17.

As illustrated in FIG. 6, the clamping face 35a of the die 35 may be reduced by a distance L1 from the clamping face 33a of the stripper 33 toward the hinge part 15. Instead, the die 35 may be moved by the distance L1 toward the hinge part 15. These are achievable without deteriorating the clamping effect of the load beam 17 because the edge 25a of the reinforcing plate 25 according to the present invention acts like a replacement of the die 35.

Step S4 is a bending process that presses a punch 37 relative to a free end 17d of the load beam 17 held between the stripper 33 and the die 35. This bends the load beam 17 along the edge 25a of the reinforcing plate 25 toward the reinforcing plate 25 in the thickness direction without the load beam 17 being directly in contact with the die 35, as illustrated in FIGS. 5 and 6. This bending process bends the load beam 17 together with the longitudinal bends 17a formed on the load beam 17 in step S1.

Pressing the punch 37 relative to the free end 17d of the load beam 17 held between the stripper 33 and the die 35 is achievable in three modes. First is keeping the stripper 33 and die 35 immovable and moving the punch 37. Second is keeping the punch 37 immovable and moving the stripper 33 and die 35. Third is moving the stripper 33, die 35, and punch 37 in an interlocked manner. All of these modes fall in the scope of the present invention.

The punch 37 used in step S4 is a metal mold made of tool steel such as low-alloy tool steel, die steel, and high-speed tool steel, like the stripper 33 and die 35. The punch 37 is shaped in a semicylinder as illustrated in FIG. 5 and has a contact face 37a whose width is equal to or larger than the width of the load beam 17.

In step S4, the contact face 37a of the punch 37 is pressed to the free end 17d of the load beam 17 on the longitudinally opposite side portion with respect to the reinforcing plate 25. At this time, the contact face 37a of the punch 37 is linearly in contact with the free end 17d of the load beam 17, as illustrated with a contact line 37b in FIG. 5. At this time, the load beam 17 is not directly in contact with the die 35 as illustrated in FIG. 6. The edge 25a of the reinforcing plate 25 acts like a die to bend the load beam 17 along the edge 25a.

In step S4, it is preferable that a distance L2 between the edge 25a of the reinforcing plate 25 and the contact line 37b on the contact face 37a of the punch 37 is minimized. If the distance L2 is large, the pressing force of the punch 37 is absorbed by the resiliency of the free end 17d of the load beam 17, to improperly bend the load beam 17 and incorrectly form the bend 17c.

Step S5 is a joining process that fixes the flexure 19 by laser spot welding to the load beam 17 (rigid part 14) of the head suspension 11 on the longitudinally opposite side portion with respect to the reinforcing plate 25.

Through these steps, the head suspension 11 according to the first embodiment is completed as illustrated in FIGS. 2 and 7A.

According to the first embodiment, the head suspension 11 includes the reinforcing plate 25 attached to the portion of the rigid part 14 of the load beam 17 proximal to the hinge part 15. The load beam 17 is provided with the bend 17c bent along the edge 25a of the reinforcing plate 25 toward the reinforcing plate 25.

With the edge 25a of the reinforcing plate 25 acting like a replacement of the die 35 and serving as a bending strength boundary, the bend 17c is easily and correctly formed without torsion.

With the reinforcing plate 25, the first embodiment improves the rigidity of the rigid part 14 at the portion proximal to the hinge part 15 and the load beam 17 as a whole, thereby securing dynamic characteristics for the head suspension 11.

According to the first embodiment, the bend 17c balances mass distributed along a torsional axis between the hinge part 15 and the apex of the dimple of the magnetic head slider and moves the gravitational center of the load beam 17 including the magnetic head slider onto the torsional axis. This prevents the torsional axis from deviating from the apex of the dimple during operation of the hard disk drive in which the head suspension 11 is installed. Namely, the bend 17c improves the dynamic characteristics of the load beam 17.

According to the first embodiment, part of the rigid part 14 on the hinge part 15 side of the bend 17c has an improved rigidity due to the reinforcing plate 25. This high rigidity part of the rigid part 14 provided with the reinforcing plate 25 firmly supports the front part 17b of the load beam 17 on the other side with respect to the bend 17c, i.e., the portion of the rigid part 14 distal to the hinge part 15 while easily and properly forming the bend 17c on the load beam without a twist. This configuration prevents the load beam 17 from twisting or bending during an information seeking operation. This is advantageous in achieving a high-speed seeking operation or in realizing high-density tracks on a magnetic disk.

According to the method of manufacturing the head suspension 11, the clamping process clamps the joint area 29 (FIG. 3A) of the load beam 17 and reinforcing plate 25 between the stripper 33 and die 35, to secure a sufficiently wide clamping area.

According to the method, only by accurately joining the reinforcing plate 25 with the load beam 17 in a sway direction (the lateral direction of the head suspension 11), the load beam 17 is easily and properly bent without a twist along the edge 25a of the reinforcing plate 25 that defines a bending strength boundary.

Namely, the method easily and properly forms the bend 17c on the load beam 17 without torsion, thereby providing the head suspension 11 with optimum dynamic characteristics.

According to the method, the bend 17c of the load beam 17 is formed without directly pressing the load beam 17 to the die 35 that receives strongest stress from the punch 37. The bend 17c is formed by using the edge 25a of the reinforcing plate 25 as a replacement of the die 35.

The method, therefore, extends the service life of the die 35, reduces the number of times of maintenance of the die 35, and improves the productivity of head suspensions.

The head suspension manufacturing method is applicable to the head suspensions of the second and third embodiments by properly modifying the method.

A head suspension according to the second embodiment of the present invention will be explained with reference to FIG. 7B that is a side view of the head suspension.

The head suspension 41 of the second embodiment mostly employs the same parts as the head suspension 11 of the first embodiment. Accordingly, the same parts are represented with the same reference marks to omit a repetition of explanation. A part characteristic to the second embodiment will be explained.

According to the first embodiment, the head suspension 11 (FIG. 7A) includes the load beam 17 having the bend 17c bent along the edge 25a of the reinforcing plate 25 toward the reinforcing plate 25. Namely, the first embodiment is characterized by using the edge 25a of the reinforcing plate 25 when forming the bend 17c.

On the other hand, the head suspension 41 according to the second embodiment employs a low rigidity part 17e (FIG. 7B) to form a bend 17f on a load beam 17. The low rigidity part 17e is formed on the load beam 17 along an edge 25a of a reinforcing plate 25 attached to the load beam 17.

The low rigidity part 17e is a recess 17e having a width L3 and is formed on a portion adjoining to the reinforcing plate 25. The recess 17e may be formed by partially etching the load beam 17 along the edge 25a of the reinforcing plate 25. The partial etching may thin the load beam 17 by about 60% at the maximum.

According to the second embodiment, the edge 25a of the reinforcing plate 25 acts like a replacement of the die 35 when forming the bend 17f on the load beam 17. At this time, the recess 17e of the width L3 provides the bend 17f smoothly curved and having a constant curvature as illustrated in FIG. 7B.

In addition to the effect of the first embodiment, the second embodiment provides an effect of easily and surely bending the load beam 17 of the head suspension 41 along the edge 25a of the reinforcing plate 25.

The bend 17f of the load beam 17 according to the second embodiment has a smooth curve corresponding to the width L3 of the recess 17e.

When a flexure 19 is fixed to the load beam 17 on the longitudinally opposite side portion with respect to the reinforcing plate 25, the flexure 19 is brought into close contact with the bend 17f that is smoothly curved according to the second embodiment to be attached to the load beam 17.

The head suspension 41 of the second embodiment, therefore, is capable of flexibly coping with various design requirements.

A head suspension according to the third embodiment of the present invention will be explained with reference to FIG. 7C that is a side view of the head suspension.

The head suspension 51 of the third embodiment mostly employs the same parts as the head suspension 41 of the second embodiment. Accordingly, the same parts are represented with the same reference marks to omit a repetition of explanation. A part characteristic to the third embodiment will be explained.

According to the second embodiment illustrated in FIG. 7B, the load beam 17 of the head suspension 41 is provided with the low rigidity part 17e along the edge 25a of the reinforcing plate 25 that is attached to the load beam 17.

On the other hand, the head suspension 51 according to the third embodiment employs a reinforcing plate 25 that has a thinned part 25b of a uniform thickness along an edge 25a as illustrated in FIG. 7C. The reinforcing plate 25 is joined with a load beam 17.

The thinned part 25b is formed by partially etching the edge 25a of the reinforcing plate 25 by a width L4. The thinning may be made up to about 80% of the thickness of the reinforcing plate 25 at the maximum.

As illustrated in FIG. 7C, the reinforcing plate 25 has two edges 25a. These two edges 25a act like a replacement of the die 35 when bending the load beam 17 of the head suspension 51. A bend 17g thus formed on the load beam 17 is smoothly curved and has a constant curvature along the thinned part 25b having the width L4.

In addition to the effect of the head suspension 41 of the second embodiment, the head suspension 51 of the third embodiment provides an effect that the bend 17g of the load beam 17 is smooth along the thinned part 25b having the width L4.

When a flexure 19 is fixed to the load beam 17 on the opposite side portion of the reinforcing plate 25, the flexure 19 is brought into close contact with the bend 17g that is smoothly curved according to the third embodiment to be attached to the load beam 17.

Accordingly, the head suspension 51 of the third embodiment is capable of flexibly coping with various design requirements.

Although the present invention has been explained above by reference to certain embodiments of the present invention, the present invention is not limited to the embodiments. Modifications and variations of the embodiments will occur to those skilled in the art in light of the teachings. Head suspensions and methods of manufacturing head suspensions according to such modifications and variations also fall in the scope of the present invention.

In the embodiments explained above, the reinforcing plate 25 substantially has a T-shape, overlaps and joined with the portion of the rigid part 14 of the load beam 17 proximal to the hinge part 15. This does not limit the present invention. The reinforcing plate 25 attached to the rigid part 14 may have any shape depending on design requirements.

The present invention is applicable to head suspensions of optional sizes and to manufacturing such head suspensions.

What is claimed is:

1. A head suspension comprising:
    a load beam having a rigid part and a hinge part;
    a base plate resiliently supporting the rigid part through the hinge part of the load beam;
    a reinforcing plate comprising a metal plate, and being joined with a portion of the rigid part proximal to the hinge part, the metal plate including a portion defining an edge of the reinforcing plate on a middle portion of the load beam; and
    a bend formed on the middle portion of the load beam overlapping the portion of the metal plate defining the edge of the reinforcing plate in a thickness direction by plastically bending the load beam toward the reinforcing plate along the edge of the reinforcing plate, so that a front part of the load beam with respect to the bend shifts toward the reinforcing plate in the thickness direction relative to a base part of the load beam with respect to the bend.

2. The head suspension of claim 1, further comprising:
    a through hole formed through the reinforcing plate.

3. The head suspension of claim 1, further comprising:
    a flexure resiliently supporting a write/read head, attached to a opposite side portion of the load beam with respect to the reinforcing plate.

4. The head suspension of claim 1, further comprising:
    longitudinal bends formed by bending each longitudinal edge of the rigid part of the load beam toward the reinforcing plate side.

5. The head suspension of claim 1, wherein the metal plate portion defining the edge where the bend in the load beam occurs is away from the hinged part.

6. A head suspension comprising:
    a load beam having a rigid part that extends proximal to a hinge part;

a base plate distal to the rigid part and hinge part, and resiliently supporting the rigid part through the hinge part located between the base plate and the rigid part; and a reinforcing plate situated along the load beam and comprising a metal plate, the reinforcing plate being joined with a portion of the rigid part proximal to the hinge part, the metal plate having a most proximal edge defining a most proximal edge of the reinforcing plate at a middle portion of the load beam; and wherein the load beam has a bend at said middle portion at the most proximal edge of the metal plate, said bend bending toward the reinforcing plate so that a proximal part of the load beam proximal to the bend shifts toward the reinforcing plate in a thickness direction relative to a distal part of the load beam distal to the bend.

* * * * *